(12) United States Patent
Gabusi

(10) Patent No.: US 12,280,496 B2
(45) Date of Patent: Apr. 22, 2025

(54) APPARATUS AND METHOD FOR THE AUTOMATED MANAGEMENT OF BACTERIAL LOAD DETECTOR DEVICES

(71) Applicant: I.M.A. Industria Macchine Automatiche S.p.A., Ozzano dell'Emilia (IT)

(72) Inventor: Gabriele Gabusi, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 940 days.

(21) Appl. No.: 17/421,189

(22) PCT Filed: Jan. 7, 2020

(86) PCT No.: PCT/IT2020/050001
§ 371 (c)(1),
(2) Date: Jul. 7, 2021

(87) PCT Pub. No.: WO2020/144722
PCT Pub. Date: Jul. 16, 2020

(65) Prior Publication Data
US 2022/0055232 A1    Feb. 24, 2022

(30) Foreign Application Priority Data
Jan. 8, 2019    (IT) .......................... 102019000000166

(51) Int. Cl.
*B25J 21/00*    (2006.01)
*G01N 35/04*    (2006.01)

(52) U.S. Cl.
CPC ............ *B25J 21/005* (2013.01); *G01N 35/04* (2013.01); *G01N 2035/0429* (2013.01); *G01N 2035/0465* (2013.01)

(58) Field of Classification Search
None
See application file for complete search history.

(56) References Cited

U.S. PATENT DOCUMENTS 3,907,389 A * 9/1975 Cox ........................... B01L 1/02
976/DIG. 363
4,111,753 A * 9/1978 Folsom ................... C12M 41/14
435/801

(Continued)

FOREIGN PATENT DOCUMENTS

JP    H0271982 A    3/1990

OTHER PUBLICATIONS

Int'l Search Report and Written Opinion issued May 20, 2020 in Int'l Application No. PCT/IT2020/050001.

*Primary Examiner* — Brian R Gordon
(74) *Attorney, Agent, or Firm* — Panitch Schwarze Belisario & Nadel LLP

(57) ABSTRACT

An apparatus and method provide for automated management of bacterial load detector devices to be temporarily positioned inside a chamber, delimited by walls, at least one of the walls includes at least one access aperture on which a primary closing unit is installed, configured to allow access to an inside of the chamber while keeping an atmosphere of the chamber isolated and separated from an external environment. The apparatus comprises a transport container, containing an extractable housing slider on which one or more bacterial load detector devices are positioned, an extraction device configured to extract the housing slider from the transport container and make the housing slider available inside the chamber, and a support device disposed inside the chamber configured to stably position and support the housing slider.

17 Claims, 4 Drawing Sheets

(56) References Cited

U.S. PATENT DOCUMENTS

| | | | | |
|---|---|---|---|---|
| 4,162,196 | A | * | 7/1979 | Folsom .................... B01L 1/02 |
| | | | | 435/809 |
| 4,904,153 | A | | 2/1990 | Iwasawa et al. |
| 2003/0092186 | A1 | * | 5/2003 | Pressman ............ B01L 3/50825 |
| | | | | 436/178 |
| 2004/0185521 | A1 | | 9/2004 | Yoshida et al. |
| 2005/0089448 | A1 | * | 4/2005 | Bishop ............. G01N 35/00029 |
| | | | | 422/562 |
| 2010/0291619 | A1 | * | 11/2010 | Robinson ........... G01N 35/0099 |
| | | | | 435/288.7 |
| 2013/0183893 | A1 | * | 7/2013 | Gartner ................ B08B 15/023 |
| | | | | 361/225 |
| 2015/0202619 | A1 | * | 7/2015 | Bransgrove ............ A61B 5/157 |
| | | | | 422/401 |
| 2016/0032358 | A1 | * | 2/2016 | Buse .................... B01L 7/5255 |
| | | | | 435/6.12 |
| 2017/0205436 | A1 | * | 7/2017 | Oonuma ............. G01N 35/025 |
| 2017/0219616 | A1 | * | 8/2017 | Pedrazzini ......... G01N 35/0099 |
| 2017/0247132 | A1 | | 8/2017 | Deutschle et al. |
| 2017/0341873 | A1 | * | 11/2017 | Vivet .................... B65G 47/06 |
| 2018/0282788 | A1 | * | 10/2018 | Opalsky ................ G01F 23/268 |
| 2019/0094253 | A1 | * | 3/2019 | Hirama ................ G01N 35/025 |
| 2019/0252169 | A1 | * | 8/2019 | Bullock ............. H01J 49/0413 |
| 2020/0061605 | A1 | * | 2/2020 | Edmiston ............. B01L 3/5082 |
| 2020/0191814 | A1 | * | 6/2020 | Yamashita ............. G01N 35/04 |
| 2021/0063423 | A1 | * | 3/2021 | Yamashita ............. G01N 35/00 |

* cited by examiner

APPARATUS AND METHOD FOR THE AUTOMATED MANAGEMENT OF BACTERIAL LOAD DETECTOR DEVICES

CROSS-REFERENCE TO RELATED APPLICATIONS

This application is a Section 371 of International Application No. PCT/IT2020/050001, filed Jan. 7, 2020, which was published in the English language on Jul. 16, 2020, under International Publication No. WO 2020/144722 A1, which claims priority under 35 U.S.C. § 119(b) to Italian Application No. 102019000000166, filed Jan. 8, 2019, the disclosures of each of which are incorporated herein by reference.

FIELD OF THE INVENTION

The invention concerns an apparatus and method for the automated management of bacterial load detector devices, such as for example sedimentation plates, in particular Petri dishes, or swabs. The apparatus according to the present invention is configured, in particular, to automatically insert and remove the devices as above inside a machine for packaging or processing pharmaceutical products that operates in a protected environment and in controlled and defined atmospheric conditions, generally called "isolator".

BACKGROUND OF THE INVENTION

In the pharmaceutical sector, the operations of processing and packaging pharmaceutical products such as, for example, powders, tablets, pills, or suchlike, are carried out inside a chamber protected and separated from the external environment, generally called "clean room" or "isolator", which is kept in sterile conditions and at a controlled atmosphere.

Processing and/or packaging devices and equipment are disposed inside the protected chamber, which are connected with the outside by special entrances and exits provided with transfer ports that allow a protected transfer of material inside and outside the protected chamber, preventing a direct connection between the internal and the external environment of the chamber itself. These transfer ports, which are subject to certifications attesting their compliance with current regulations, are generally known as "Alpha-Beta" ports or also as "RTPs", an English acronym for "Rapid Transfer Port".

The protected chamber is also normally provided with handling devices that allow an operator to interact with the products and/or the equipment located inside it, such as for example gloves by means of which an operator can operate inside the protected chamber. The gloves are generally attached in a sealed manner to a special hole provided on a wall of the protected chamber, from which they project into the chamber.

In order to ensure that the required sterility requirements are always met, that is, that there are no microorganisms or polluting agents inside the protected chamber, it is provided to carry out regular checks of the bacterial load that may be present in the chamber, through the use of sedimentation plates, also called Petri dishes, well known in the state of the art.

The plates are inserted in the protected chamber, through a transfer port, manually positioned by the operator in various predetermined zones inside it by means of the gloves as above, and left for a determinate period of time before being removed by the operator, always by means of the gloves, in order to be extracted from the protected chamber through the transfer port.

The plates thus collected are kept in quarantine for a determinate period of time to allow the growth of the possible bacteria present in the culture medium, and subsequently sent to the subsequent analysis steps to determine whether undesired contaminants or microorganisms are present in the plates analyzed on each occasion.

In this way, it is verified a posteriori that the products of a certain batch, processed or packaged during a determinate period of time, meet all the required sterility criteria.

The sedimentation plates comprise a glass or plastic receptacle, usually of a discoidal shape, inside which a solid and/or semi-solid culture medium is inserted, and a lid that closes the receptacle. Naturally, the sedimentation plates are left open in the predetermined zone, for the planned period of time.

According to the solutions of the state of the art, all the steps of removing and affixing the lid, introducing, positioning and extracting the plates into and from the protected chamber are carried out by an operator by means of the special gloves provided and attached to the walls of the chamber.

The operator, in particular, at predefined time intervals, operating through the gloves provided on the walls of the chamber, takes a plate, removes its lid, and positions it inside the chamber, where he/she leaves it to act for a determinate period of time before removing it, closing it with the lid, and taking it outside the chamber.

One disadvantage of these known solutions is that the gloves used, while allowing to operate inside the insulator in a manner that is separate from it, can be a mean of conveying contaminants inside the chamber. In fact, it can happen that during use, holes or incisions form on the gloves, through which contaminants can penetrate inside the protected chamber.

Furthermore, these solutions can lead to safety problems for operators, for example in the case where gloves are damaged and the operators come into contact with pharmaceutical products which can be dangerous, toxic and/or harmful to their health, or harmful to the surrounding environment. In the known solutions, moreover, the gloves can lead to contamination of the plates during their insertion into and/or during their removal from the chamber, or during the step of closing the plates, thus compromising the correct monitoring of the sterility of the internal environment of the chamber.

The subsequent analysis, in fact, could lead to incorrect results, for example signaling the presence of contaminants and microorganisms that in reality may not even be actually present inside the chamber, but may have been conveyed onto the plate from the outside through the gloves, with the risk of eliminating batches of products that actually meet all requirements. Consequently, this disadvantage can entail a considerable increase in the overall production costs due to waste, caused by the unnecessary discarding of compliant products, and the consequent need to repeat production.

In order to try to overcome the above disadvantages, solutions are also known that provide to use a continuous monitoring system with lasers to verify the presence of possible contaminants. However, while these optical solutions avoid the laborious manual management of the sedimentation plates, they do not allow to recognize and identify the type of contaminant or microorganism, only indicating that contaminants are present. This is naturally disadvantageous, since it is useful to know the classification of the contaminants found in order to be able to undertake the most suitable subsequent corrective actions.

Another solution known in the state of the art is described, for example, in U.S. patent application no. US-A1-2004/0185521, concerning an apparatus and a method for sampling microorganisms inside an isolator without requiring manual interventions by an operator.

One purpose of the present invention is to provide an apparatus and method for the automated management of bacterial load detector devices, such as for example sedimentation plates or swabs, inside a closed chamber which overcome at least one of the disadvantages of the solutions known in the state of the art.

One purpose of the invention is to provide an apparatus and method for the management of bacterial load detector devices that do not require any manual intervention by the operator through gloves, thus allowing to perform an efficient monitoring of the sterility of the internal atmosphere of the chamber.

Another purpose of the present invention is to provide an apparatus and method for the automated management of bacterial load detector devices which eliminate, or at least significantly reduce, possible problems of contamination of the plates due to contaminants conveyed from the outside, in particular through the gloves, and therefore allow effective and reliable monitoring of the internal environment of the chamber.

Another purpose is to provide an apparatus and method for the automated management of bacterial load detector devices which guarantee that the sterility level required for the protected chamber in each operating step is maintained, therefore at least during the insertion, the positioning and the removal of the devices.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

Embodiments described here concern an apparatus for the automated management of bacterial load detector devices inside a clean room. In particular, the apparatus for the automated management of bacterial load detector devices allows to position them temporarily in an operating zone inside an isolated chamber with a controlled atmosphere, the chamber being delimited by walls, wherein at least one of the walls is provided with an access aperture on which a primary closing unit is installed, inside the chamber, configured to allow access inside the chamber while keeping its atmosphere isolated and separated from the external environment.

In a preferred embodiment, the bacterial load detector devices are configured as sedimentation plates in which a bacterial culture medium can be disposed, also called Petri dishes, and comprise a receptacle closed by a lid. In another embodiment, the bacterial load detector devices are configured as swabs.

The management apparatus according to the present invention comprises:

a transport container configured to be associated with the aperture for access from the outside of the chamber, and provided with a secondary closing unit able to cooperate with the primary closing unit of the chamber so that they can be opened together in order to put the inside of the transport container in communication with the inside of the chamber;

a housing slider able to house one or more bacterial load detector devices and configured so as to be contained sliding inside the transport container;

a support device, disposed inside the chamber and configured to stably position and support the housing slider extracted from the transport container;

an automatic operator device positioned in the chamber and provided with gripping means configured to grip and move at least one of the bacterial load detector devices as above at a time, in order to alternately remove it from, or deposit it in, the slider, wherein the automatic operator device is associated with a mobile base configured to be driven to move on an internal surface of the chamber so as to move the automatic operator device inside the chamber toward and away from the support device.

In particular embodiments, the mobile base comprises horizontal movement members, configured to allow the movement and translation of the automatic operator device on a substantially horizontal plane and vertical movement members configured to allow a movement along a substantially vertical plane.

According to embodiments provided here, the apparatus comprises an extraction device disposed inside the chamber and configured to extract the slider from the transport container and make it available inside the chamber, when the transport container is associated with the access aperture.

In some embodiments, the apparatus comprises at least one operating station disposed inside the chamber, and configured to perform at least one respective operating step on the bacterial load detector devices as above.

In accordance with some forms of embodiment, the apparatus comprises a control and command unit configured to control and command at least the automatic operator device to move it inside the chamber at least between the support device, and at least one of either the operating zone or one or more of the operating stations as above and to selectively determine the removal or deposit of at least one of the bacterial load detector devices with respect to the slider.

According to some embodiments, the control and command unit is configured to define a plurality of operating zones inside the chamber, suitable to receive a respective bacterial load detector device, wherein these zones preferably do not interfere with the processing and/or packaging devices present in the chamber and/or with the paths along which the automatic operator device is moved.

According to one embodiment, the operating stations as above comprise a station to remove/close the lid from/on the respective receptacles by means of a device to remove and/or close lids. In a preferred embodiment, the device to remove and/or close lids comprises at least one gripping member of the sucker type connected to depression means suitable to create a depression sufficient to suck up and retain the lid.

According to some embodiments, the operating stations as above comprise a marking station provided with a marking device configured to apply and/or impress a mark on the lid of a closed plate bearing information comprising one or more of either the production batch number, the time and/or day on which the plate was closed, the operating zone in which the plate was disposed.

According to some embodiments, the transport container and the chamber are provided with respective closing units suitable to cooperate with each other in order to produce a rapid transfer port (RTP), also called Alpha-Beta port.

Thanks to the management apparatus according to the invention, the operations of inserting, positioning and removing the bacterial load detector devices, for example the sedimentation plates, into/from the protected chamber can be performed in a completely automated manner, without the need for any manual intervention whatsoever from an operator.

All the operations of removing the plates, removal of the lid, positioning, recovery and delivery of the plates, in fact, are performed autonomously by the automatic operator device.

The operator, therefore, possibly only handles the transport container when this is in the closed condition, reducing to a minimum, if not eliminating, the possible contamination of the plates caused by problems with the handling devices.

According to some embodiments, the slider is provided with sliding and guide means configured to cooperate with guide members provided in the transport container and in the support device in order to facilitate the transfer of the slier from the transport container to the support device, and vice versa The shape and the disposition of the sliding and guide means and of the respective guide members are such that the slider completes a fixed and defined path both during the insertion into the chamber, and also during its removal therefrom to be placed back in the transfer device at the end of the collection of the plates. This allows to move the housing slider in a simple, quick and reliable manner, allowing this operation to be performed automatically, without the need for any manual intervention whatsoever by an operator. Furthermore, the absence of manual operations by an operator eliminates, or considerably reduces, the risk of leakages of the materials or substances treated inside the protected chamber, with a consequent increase in the safety of operators and decrease of the possible damaging environmental impact of these substances on the surrounding environment.

According to some embodiments, the automatic operator device is an anthropomorphic arm or robot.

According to some embodiments, the automatic operator device can be configured to move along a pre-established path inside the chamber.

Embodiments described here also concern a method for the automated management of bacterial load detector devices inside a clean room delimited by walls, at least one of which is provided with at least one access aperture able to be selectively closed by means of a primary closing unit.

The method according to the invention provides to:
associate a transport container provided with a secondary closing unit outside the chamber, in correspondence with the access aperture, the secondary closing unit being able to cooperate with the primary closing unit so that they can be opened in order to put the inside of the transport container in communication with the inside of the chamber;
prepare a housing slider able to house one or more bacterial load detector devices, the housing slider being configured so as to be contained sliding inside the transport container;
drive the primary closing unit and the secondary closing unit and put the inside of the transport container in communication with the inside of the chamber;
extract the slider from the transport container and make it available inside the chamber;
position the slider with the bacterial load detector devices on a support device inside the chamber;
remove the bacterial load detector devices from the slider by means of an automatic operator device;
dispose at least one of the bacterial load detector devices as above removed from the slider in a predefined operating zone inside the clean room; wherein the step of disposing the bacterial load detector device in the operating zone as above provides to drive a mobile base associated with the automatic operator device in order to move the latter on an internal surface of the clean room.

ILLUSTRATION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

Figure 1:
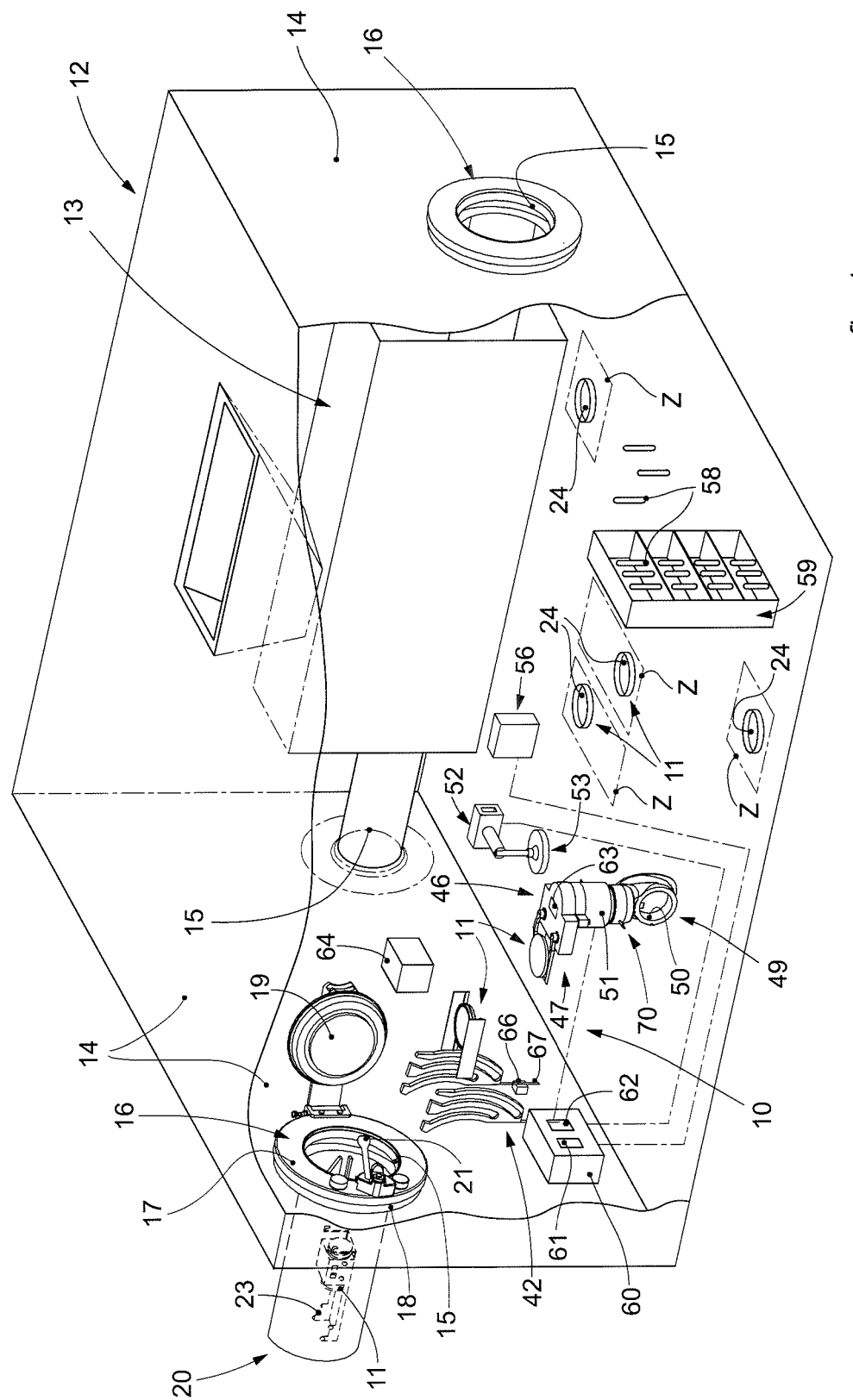
FIG. 1 is a schematic view of an isolator provided with an apparatus for the automated management of bacterial load detector devices according to embodiments described here.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Embodiments described here concern an apparatus 10 for the automated management of bacterial load detector devices inside a protected chamber 12 or clean room, also called "isolator" in the field, of a machine for processing and/or packaging pharmaceutical products.

Here and in the following description, we will describe, by way of a non-limiting example, embodiments in which the bacterial load detector devices are configured as sedimentation plates, also called Petri dishes, indicated with reference number 11.

In variant embodiments provided here, we will also describe embodiments, which can be combined with the previous ones, in which the bacterial load detector devices according to the present invention are configured as swabs, indicated with reference number 58.

In other words, the apparatus 10 is configured to manage both Petri dishes 11 and also swabs 58, or only one or the other.

The apparatus 10 is suitable to be used in particular in the pharmaceutical sector to insert and position Petri dishes 11 in the protected chamber 12, and subsequently to remove them from the protected chamber 12 once a predefined period of time has elapsed.

Devices 13 for handling, processing and/or packaging pharmaceutical products, such as for example tablets, pills, or suchlike, are positioned inside the protected chamber 12.

The protected chamber 12 is separated from the external environment by walls 14 and is also provided with access apertures 15 associated with respective closing devices 16 structured so as to allow a protected transfer of material inside or outside the chamber 12.

According to some embodiments, the closing devices 16 can be rapid transfer ports (RTP), or Alpha-Beta ports, provided with a primary closing unit 17, also indicated as Alpha unit, suitable to couple with a mating secondary closing unit 18, also indicated as Beta unit, provided on a transfer device, for example a transport container 20, by means of suitable reciprocal coupling interfaces.

The primary closing unit 17 can be installed on the access aperture 15 inside the chamber 12.

According to some embodiments, the primary closing unit 17 comprises coupling means, comprising a flange 32 which surrounds the access aperture 15, a door 19 which closes the access aperture, a clamping member 21 of the door 19, and sealing elements.

According to some embodiments, the door 19 of the primary closing unit 17 can be hinged on one side to the flange 33, so as to rotate with respect thereto between a closed condition and an open condition.

According to some embodiments, the closing units 17, 18 can be conformed so that, once coupled to each other, they can be opened in a manner functionally correlated with each other, since the opening of the door 19 of the primary closing unit 17 determines the opening of both doors 19, putting the inside of the transport container 20 in communication with the inside of the protected chamber 12, maintaining the respective internal environments, now communicating with each other, separate and isolated from the external environment.

According to some embodiments, the apparatus 10 comprises a mobile transport container 20 configured to contain one, or a plurality of, plates 11 inside it, in order to be able to transport them in a closed and sealed condition.

According to some embodiments, the transport container 20 comprises a tubular body 22 closed at one end 22b and provided at the opposite end 22a with a secondary closing unit 18 suitable to couple in a sealed manner with a main closing unit 17 provided on a wall 14 of the chamber 12.

According to some embodiments, the secondary closing unit 18 comprises a coupling flange 33 configured to couple with the flange 32 of the primary closing unit 17, and a lid 35 configured to couple with the door 19 and follow its movements.

According to some embodiments, the transport container 20 comprises a housing slider 23 configured to house the plates 11 in an orderly manner one adjacent to the other.

The slider 23 is disposed sliding in the tubular body 22.

According to some embodiments, the plates 11 comprise a substantially flat receptacle 24, inside which a solid or semi-solid culture medium is disposed, and a lid 25 which closes the receptacle 24. The lid 25 has the purpose of preventing the passage of microorganisms in order to maintain the sterility of the culture medium when the plate is not in use.

According to some embodiments, the slider 23 has a support plane 26 having a longitudinal development, which is delimited in correspondence with a first end 26a by an abutment wall 27 which extends in a transverse direction thereto, defining a substantially L-shaped shape with the support plane 26.

The support plane 26 is also delimited laterally by a pair of lateral walls 28 which develop parallel to each other.

According to some embodiments, the lateral walls 28 extend up to a distance from the abutment wall 27 equal to at least the height of a plate 11. In other words, the abutment wall 27 and the edges of the lateral walls 28 are distanced from each other so as to define a passage gap 29 between them at least equal to the height of the plate 11.

The slider 23 also comprises a containing plane 30, which extends substantially parallel to the support plane 26 at least for a portion thereof located in the proximity of a head end 23a of the slider 23.

The containing plane 30, together with the lateral walls 28 and the support plane 26, defines a box-like containing structure 31 which surrounds the plates 11 on four sides, preventing unwanted movements thereof in the transverse direction.

During use, the plates 11 are disposed stacked on each other resting against the abutment wall 27 and inside the box-like structure 31.

When the slider 23 is inserted in the tubular body 22, it can be disposed with the head end 23a facing the open end 22a, and with a tail end 23b facing the closed end 22b.

According to some embodiments, the slider 23 is provided with sliding and guide means 34 configured to allow the slider 23 to slide outside and inside the transport container 20.

According to some embodiments, the sliding and guide means 34 comprise casters 35, pins, or bearings, attached to the lateral walls 28 and configured to cooperate with mating guide members 36 provided in the transport container 20.

Figure 3:
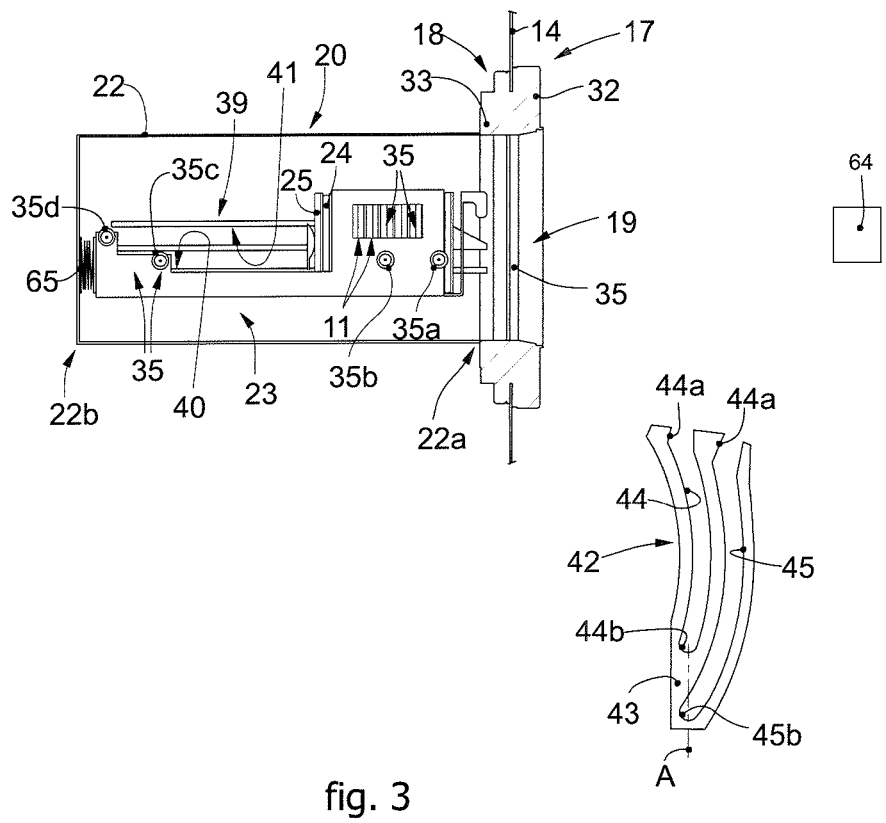
FIG. 3 is a lateral view, schematic and partly in section, of some components of the apparatus for the automated management of bacterial load detector devices according to embodiments described here, in an operative step.
Figure 4:
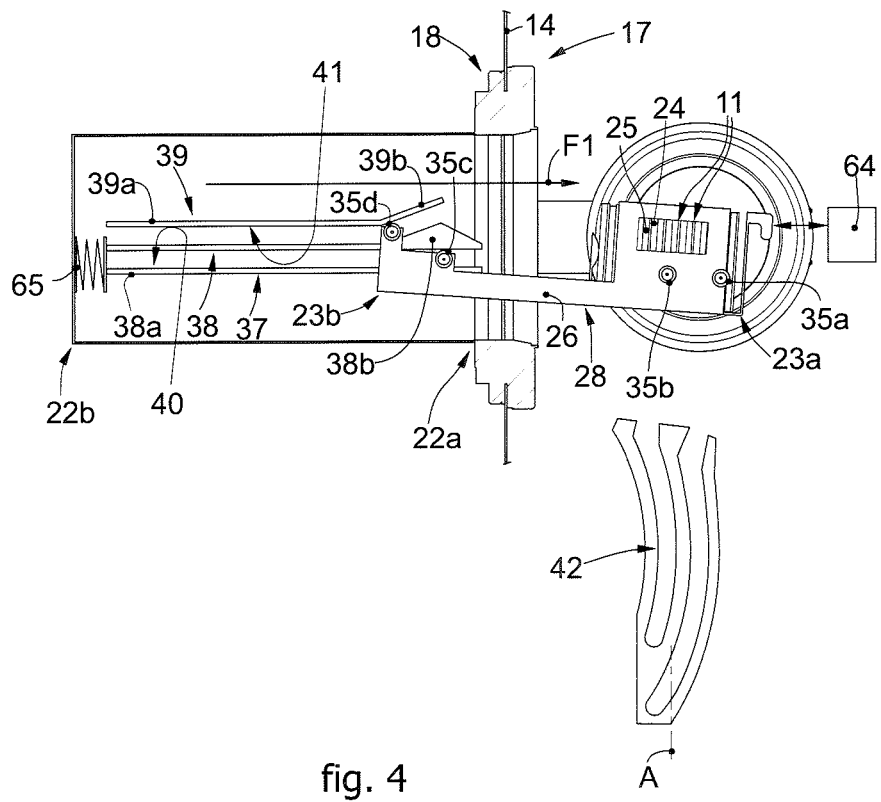
FIGS. 4-6 show some operative sequences of insertion and removal of the bacterial load detector devices inside an isolator according to embodiments described here.
Figure 5:
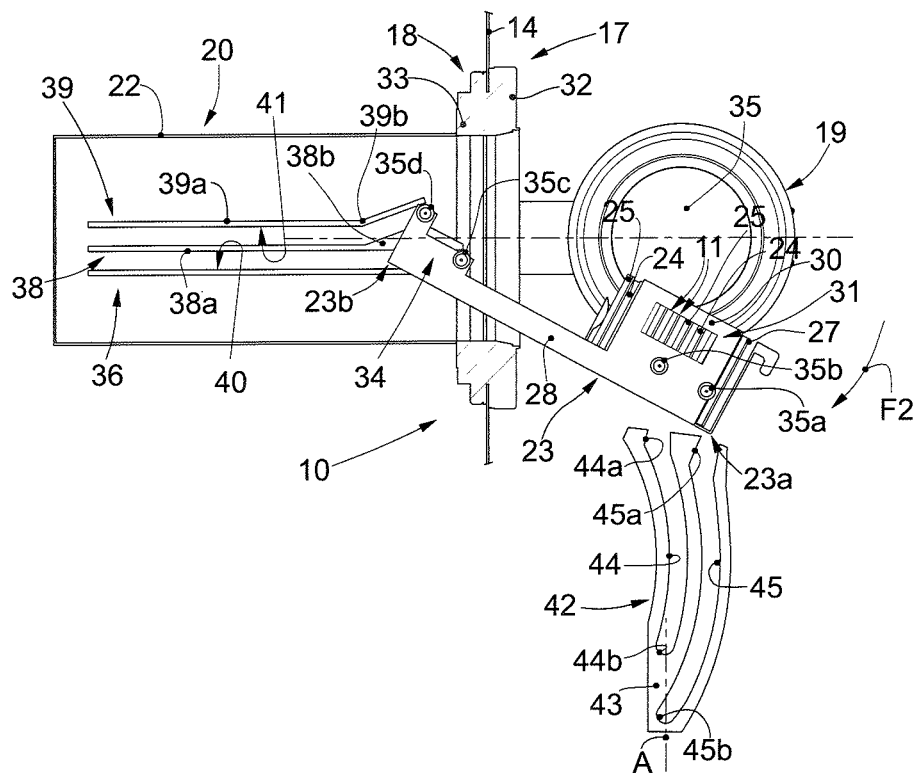

In particular, the sliding and guiding means 34 and the guide members 36 are configured so that the slider 23, during its extraction from the tubular body 22, first performs a translation in the longitudinal direction indicated with a first arrow F1 (FIGS. 3 and 4) and then a downward rotation indicated with a second arrow F2, remaining constrained with its own sliding and guide means 34 in the guide members 36 (FIG. 5).

According to some embodiments, the guide members 36 comprise pairs of suitably shaped protruding portions 37, 38, 39, which extend parallel to each other and protrude toward the inside of the tubular body 22 from opposite walls.

According to some embodiments, a first pair of protruding portions 37 extends substantially rectilinear in a longitudinal direction.

A second pair of protruding portions 38 has a first rectilinear segment 38a toward the closed end 22b and a second substantially triangular shaped segment 38b toward the opposite open end 22a.

A third pair of protruding portions 39 has a first rectilinear segment 39a and a second segment 39b inclined toward the other, which substantially follows the development of one side of the triangle of the second segment 38b of the second pair of protruding portions 38.

Figure 6:
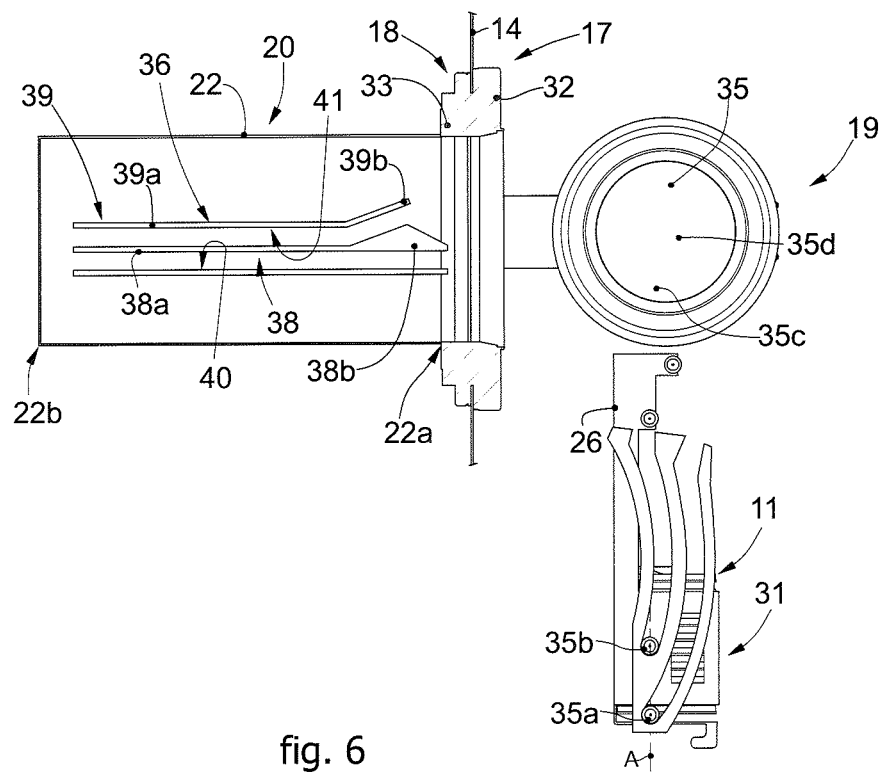

In this way, two transit channels 40, 41 are defined, better visible in FIGS. 5 and 6, of which a lower channel 40 having a rectilinear development and an upper channel 41 having a development inclined upward toward the open end 22a.

According to these embodiments, four casters 35 can be provided on each lateral wall 28 of the slider 23, of which one pair of casters 35a, 35b in the proximity of the head end 23a and one pair of casters 35c, 35d in the proximity of the tail end 23b.

Three of the casters 35, in particular the two casters 35a, 35b in the head end 23a and a third caster 35c in the proximity of the tail end 23b can be located at the same height so that they all slide inside the lower transit channel 40.

The fourth caster 35d, which is located in correspondence with the tail end 23a, can be disposed at a height different from the height of the other casters 36, and such that it can slide in the upper transit channel 41.

According to some embodiments, the apparatus 10 comprises an extraction device 64 configured to extract the slider 23 from the transport container 20, and make it available inside the chamber 12 when the transport container 20 is connected to the access aperture 15.

According to some embodiments, the extraction device 64 can be disposed inside the chamber 12, for example in the proximity of the access aperture 15, and be configured to move toward and/or away from the respective wall 14 in order to cooperate with the slider 23 and move it at least toward the inside of the chamber 12.

According to some embodiments, the extraction device 64 can cooperate with the slider 23 also in order to insert the latter into the transport container 20.

By way of example, the extraction device 64 can comprise one or more of either a gripping member, an extendable/retractable arm, a mobile arm, a linear actuator, or other similar or comparable movement means.

According to variant embodiments, an elastic element can be provided, for example a spring 65, positioned in a compressed condition in the transport container 20, between the slider 23 and the bottom end 22b, configured to facilitate the exit of the slider 23 when the closing unit 18 is opened.

According to some embodiments, the apparatus 10 also comprises a support device 42 disposed, during use, inside the protected chamber 12 and configured to position and support the slider 23.

The support device 42 is disposed in the proximity of a wall 14 in correspondence with an access aperture 15 provided with a primary closing unit 17.

According to some embodiments, the support device 42 comprises a pair of containing walls 43 provided with guide grooves 44, 45 into which the sliding and guide means 34 of the slider 23 can be inserted and slide.

According to some embodiments, there are two guide grooves 44, 45 on each containing wall 43, of which a first groove 45 facing the inside of the protected chamber 12, and a second groove 44 closer to the wall 14.

In this way, when the slider 23 is extracted from the transport container 20, the sliding and guide means 34 provided in the head end 23a, that is, the two casters 35a, 35b, are inserted in the guide grooves 44, 45, allowing the sliding and guide means 34 provided in the tail end 23b, that is, the two casters 35c, 35d, to disengage from the guide members 36 disposed in the transport container 20.

In this way, the slider 23 is completely disengaged from the transport container 20, which could therefore be suitably closed and possibly removed from the access aperture 15 as a function of needs, even while the slider 23 is positioned in the chamber 12.

The guide grooves 44, 45 have a widened portion 44a, 45a in correspondence with the upper edges of the respective containing walls 43, suitable to facilitate the introduction of the sliding and guide means 34 of the slider 23, and lower closed ends 44b, 45b, disposed on the opposite side with respect to the widened portions 44a, 45a.

According to some embodiments, the guide grooves 44, 45 both have an arched shape, with the convexity facing the inside of the protected chamber 12, and develop, at least for one segment, parallel to each other.

According to some embodiments, the first groove 45 extends for a larger segment than the second groove 44 so that the respective lower closed ends 44b, 45b are substantially aligned along a common vertical axis A, visible in FIGS. 3-6.

During the rotation of the slider 23, the first caster 35a and the second caster 35b on each side of the slider 23 are positioned respectively in the first groove 45 and in the second groove 44 so that, once they have reached the respective lower closed ends 44b, 45b, the slider 23 is positioned with its support plane 26 substantially vertical.

According to further embodiments, the support device 42 can be configured mobile in a vertical direction with respect to the access aperture 15 so as to move the slider 23 away from the zone affected by the movement of the door 19, so as to allow the door 19 to open and/or close.

According to example embodiments, there can be provided guide elements 67 configured to define a movement path for the support device 42, and movement means 66 cooperating with the guide elements 67 and configured to move the support device 42 away from/toward the access aperture 15. The movement means 66 can comprise motor members, linear actuators, or suchlike.

According to some embodiments, the automated management apparatus 10 also comprises an automatic operator device, for example a robot 46, or an anthropomorphic arm, disposed, during use, inside the protected chamber 12 and configured at least to remove a plate 11 from the slider 23, position it in a predefined sedimentation zone, recover it after a determinate period of time and place it back in the slider 23. In a particular embodiment, the automatic operator device 46 is associated with a mobile base 70 configured to be driven to move on an internal surface of the clean room 12 so as to move the automatic operator device 46 inside the chamber 12 toward and away from the support device 42.

According to some embodiments, the robot 46 comprises gripping means 47 configured to grip at least one plate 11 from the slider 23.

According to some embodiments, the gripping means 47 can comprise a pair of grippers 48 suitable to position themselves on opposite sides of the plate 11.

According to some embodiments, the grippers 48 can have sizes suitable to pass through the passage gap 29 between the abutment wall 27 and the box-like structure 31, to grip the plate 11 located resting on the abutment wall 27 and to withdraw it through the passage gap 29.

According to some embodiments, the mobile base 70 also comprises movement means 49 configured to allow the movement and displacement of the robot 46 inside the protected chamber 12.

According to some embodiments, the movement means 49 comprise horizontal movement members 50, configured to allow the movement and translation of the robot 46 on a substantially horizontal plane. By way of example, the horizontal movement members can comprise wheels, tracks, ball bearings, sliding blocks or other similar or comparable movement members.

According to further embodiments, the movement means 49 comprise vertical movement members 51 configured to allow a movement along a vertical plane of at least one portion of the robot 46, for example at least its gripping means 47. By way of example, the vertical movement members 51 can comprise linear actuators, articulated systems, and other similar and comparable members.

According to these embodiments, the robot 46 can also be configured to replace a plate 11 in the slider 23, positioning it above the highest located plate 11.

According to some embodiments, in order to facilitate the operations of replacing the plate 11 in the housing slider 23, positioning guides 55 can be provided in the proximity of the support device 42, which together define a support plane disposed at a height substantially equal to, or slightly higher than, the height at which the upper edge of the containing wall 43 of the housing slider 23 is positioned, during use.

Figure 2:
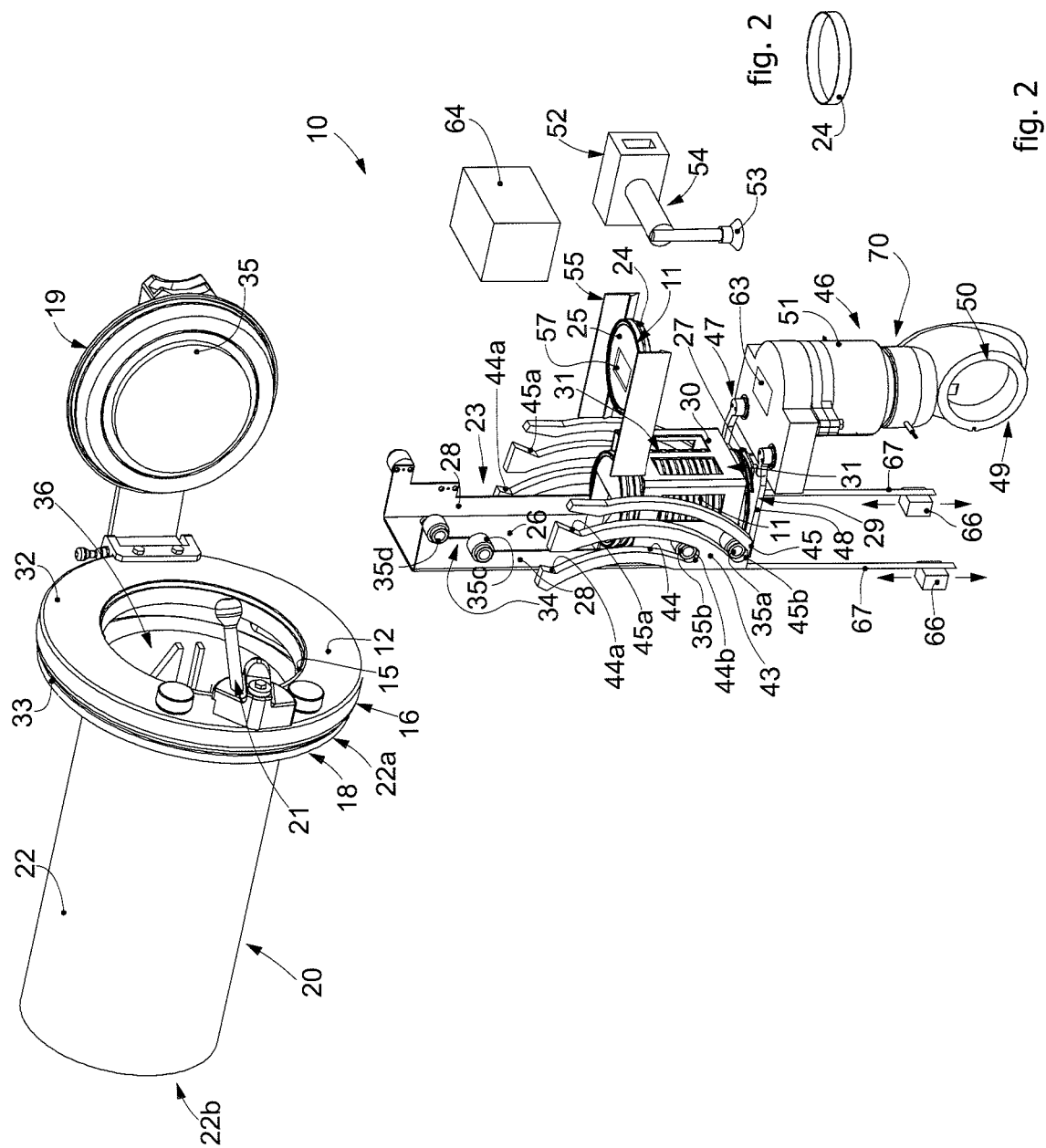
FIG. 2 is a schematic three-dimensional view of an apparatus for the automated management of bacterial load detector devices, in particular Petri dishes, according to embodiments described here.

In this way, the robot 46 can position the plate 11 on the positioning guides 55 (FIG. 2) and then thrust them in order to make it slide on them until it passes the containing wall 43, so that it can be positioned on top of the highest positioned plate 11.

According to further embodiments, the robot 46 can be configured to also carry out the operations of extracting and inserting the slider 23 from/into the transport container 20 when it is attached on the access aperture 15, itself performing the functions of the extraction device 64, or possibly cooperating with it.

According to some embodiments, the automated management apparatus 10 comprises a device 52 to remove/close lids configured to remove a lid 25 of a plate 11 separating it from the respective receptacle 24 and/or to reposition it thereon so as to close it again.

According to some embodiments, the device 52 to remove/close lids is positioned inside the protected chamber 12 and the robot 46 can be configured to transport the plate 11 removed from the slider 23 in correspondence with the device 52 to remove/close lids before positioning the receptacle 24 in a determinate sedimentation zone Z.

According to some embodiments, the device 52 to remove/close lids can comprise at least one gripping member 53 configured to grip a lid 25 and remove it from the receptacle 24 while the latter is held by the robot 46.

According to embodiments provided here, the gripping member 53 can be, for example, of the sucker type, and can be connected to depression means 54 suitable to create a depression sufficient to suck up and hold the lid 25.

The removal device 52 can also be provided with movement members, not shown, configured to move the gripping member 53 so as to move the lid 25 away from the receptacle 24 and reposition it in an adjacent zone where it can be kept until the moment in which it is necessary to proceed with the reverse closing operation.

According to some embodiments, the automated management apparatus 10 comprises a control and command unit 60 configured to control and command the functioning of the management apparatus 10 and to move the robots 46 according to a predefined path inside the protected chamber 12 as a function of the operations that have to be carried out.

According to some embodiments, the control and command unit 60 communicates with a control unit 63 of the robot 46 to communicate the operations to be carried out in real time, or according to a predefined program, and therefore determine the necessary movements inside the protected chamber 12.

According to some embodiments, the control and command unit 60 can be connected to, or provided with, a storage unit 61 in which information relating to the protected chamber 12 and/or to the plates 11 that have to be handled can be stored. For example, the information can comprise one or more of either a map of the protected chamber 12 in which a plurality of sedimentation zones Z are defined, the number of the sedimentation zones Z, the free/occupied state of the sedimentation zones Z, the type and/or the number of plates 11 disposed on a slider 23, the sedimentation time necessary for a determinate type of plates 11, or other.

According to some embodiments, the control and command unit 60 can be connected to, or provided with, a user interface 62 by means of which an operator can enter the information indicated above, start and/or stop the functioning of the apparatus 10, and/or command the automatic operator device 46.

According to some embodiments, it can be provided that the operator can only program the control and command unit 60 and transmit the commands from the latter to the control unit 63 of the robot 46 without needing to interact directly with the latter.

In particular, on the basis of the operations commanded by the control and command unit 60, the robot 46 positions itself in the proximity of the support device 42, where it removes a plate 11 by means of its gripping means 47. Subsequently, the robot 46 carries the plate 11 in the proximity of the device 52 to remove and/or close lids, where the lid 25 is removed from the receptacle 24.

Subsequently, the robot 46 moves toward an operating zone Z of sedimentation indicated by the control and command unit 60, where it positions the open receptacle 24 so that the possible microorganisms present in the air inside the chamber 12 can deposit on the culture medium.

After a predefined sedimentation time, the robot 46 once again removes the receptacle 24 from the operating zone Z, and returns it in the proximity of the device 52 to remove and/or close lids where it is closed with the lid 25 originally associated therewith.

Subsequently, the robot 46 returns in the proximity of the support device 42 in order to reposition the plate 11 on the housing slider 23 by means of the positioning guides 55 so that the plate 11 is repositioned on top of the stack of plates 11 already disposed on the housing slider 23 itself.

According to some embodiments, the apparatus 10 can also comprise a marking device 56 configured to apply and/or impress a mark 57 bearing information relating to the plate 11 before it is repositioned in the housing slider 23, for example comprising one or more of either the production batch number, the time and the day on which the plate 11 was positioned and/or was closed again, the operating zone Z in which it was positioned, or other information.

By way of example, the mark 57 can comprise one or more of either a label, writing or a stamp bearing an alphanumeric code, a bar code or a QR code, for example suitable to be read by an infrared (IR) reader.

As a function of the type of mark 57 to be applied, the marking device 56 can comprise one or more of either a marking member configured to write on the lid 25, a marking member configured to print and apply a label, or a suitable code, or even a writing member.

According to some embodiments, the marking device 56 can be disposed in an area inside the protected chamber 12, and the robot 46 can be configured to take a plate 11 in correspondence with it after it has been closed with the lid 25.

According to possible variants, the marking device 56 can be integrated on the robot 46, that is, the robot 46 can itself be provided with a marking member suitable to apply a mark 57 on the lid 25 of the plate 11.

According to further embodiments, it can be provided that the robot 46 is also configured to manage the collection of samples by means of swabs 58, so as to subject to analysis determinate surfaces of the chamber 12 and/or of the devices 13 and the equipment disposed therein.

It can be provided that a support device 59 is present in the chamber 12, for example a shelving unit or other similar element, on which a plurality of swabs 58 can be disposed, and that the robot 46 is configured to remove a swab 58 by means of its own gripping means 47, and take it into contact with a surface inside the chamber 12.

According to further embodiments, it can be provided that the swabs 58 can be taken inside and outside the chamber 12 by means of housing sliders 23 similar to those used for the plates 11.

Embodiments described here also concern a method for the automated management of the sedimentation plates 11 in a protected chamber 12.

The method according to the invention provides to attach a transport container 20, containing inside it a housing slider 23 on which a plurality of plates 11 are disposed, each comprising a receptacle 24 closed by a lid 25, to a main closing unit 17 of the protected chamber 12, by means of respective coupling flanges 32, 33. It should be noted that the disposition of the plates 11 on the housing slider 23 can be carried out previously by an operator, for example in a controlled atmosphere environment.

The transport container 20 is positioned in a closed condition, so that its secondary closing unit 18 is coupled with the main closing unit 17.

Subsequently, the method provides to drive the clamping member 21 of the primary closing unit 17 and to open the door 19 toward the inside, so as to open both the closing units 17, 18 and put the inside of the transport container 20 in communication with the inside of the protected chamber 12.

According to some embodiments, the method provides to extract the slider 23 and position it on a support device 42 inside the protected chamber 12 in the manner described above, so that the plates 11 are disposed stacked one on top of the other.

The method according to the invention also provides to remove a plate 11 from the housing slider 23 by means of an automatic operator device 46, to remove the lid 25 from the receptacle 24 and position the receptacle 24 in a predefined sedimentation zone Z inside the protected chamber 12.

As described in the embodiments described above, the removal of the lid 25 can be performed by the device 52 to remove and/or close lids, while the receptacle 24 is taken to the predefined operating zone Z of sedimentation thanks to the movement members 50, 51 with which the automatic operator device 46 is equipped.

After a predefined period of time, the method according to the invention also provides to recover the receptacle 24 from the operating zone Z, close it with the lid 25 and position it again on the slider 23 by means of the automatic operator device 46.

According to some embodiments, the method provides to repeat the operations until all the plates 11 have had their lids 25 removed, positioned in a defined operating zone Z and repositioned in the slider 23 again.

According to other embodiments, the slider 23 with the plates 11 disposed stacked on it, is again inserted in the transport container 20, for example with the aid of the automatic operator device 46 or of the extraction device 64.

Subsequently, the respective primary 17 and secondary 18 closing units are closed, possibly driving the respective clamping members 21.

In this way, the transport container 20 can be removed from the chamber 12 in a closed condition, preventing any possible contamination of the plates 11 by an operator.

The apparatus 10 and the method according to the invention can therefore also be advantageously applied to protected chambers 12 without gloves, that is, gloveless.

According to other embodiments, before repositioning the closed plate 11 on the slider 23, the method provides to apply and/or impress a mark 57 on the lid 25 bearing information comprising one or more of either the production batch number, the time and the day on which the plate 11 was positioned and/or closed, the operating zone Z of sedimentation in which it was positioned, or other.

It is clear that modifications and/or additions of parts may be made to the apparatus 10 and method for the automated management of bacterial load detector devices as described heretofore, without departing from the field and scope of the present invention.

It is also clear that, although the present invention has been described with reference to some specific examples, a person of skill in the art shall certainly be able to achieve many other equivalent forms of apparatus 10 and method for the automated management of bacterial load detector devices, having the characteristics as set forth in the claims and hence all coming within the field of protection defined thereby.

The invention claimed is:

1. An apparatus for automated management of bacterial load detector devices inside a chamber, the apparatus comprising:
   a chamber comprising walls, at least one of the walls comprising an access aperture;
   a primary closing unit connected to the access aperture and configured to selectively close the access aperture;
   a transport container connected to the access aperture from an outside of the chamber, the transport container having a secondary closing unit sealingly connected to the primary closing unit so that the primary closing unit and the secondary closing unit open together and thereby through the access aperture fluidically connects an inside of the transport container to an inside of the chamber, with the inside of the transport container and the inside of the chamber being separate from an environment that is external to the chamber and the transport container;
   a housing slider sized to house at least one of the bacterial load detector devices, the housing slider being disposed in the transport container;
   a support device disposed in the inside of the chamber, the support device being configured to support the least one of the bacterial load detector devices inside the chamber; and
   an automatic operator device positioned in the chamber and comprising gripping means for gripping and moving the at least one of the bacterial load detector devices to remove the at least one of the bacterial load detector devices from, or deposit the at least one of the bacterial load detector devices into, the housing slider;
   wherein the transport container comprises first guide members disposed in the transport container, and
   wherein the housing slider comprise sliding and guide elements engaged with the first guide members of the transport container so that the housing slider is slidable within the transport container and to protrude into the inside of the chamber.

2. The apparatus as in claim 1, further comprising an extraction device disposed inside the chamber and engageable with the housing slider to extract the housing slider from the transport container and to place the housing slider inside the chamber.

3. The apparatus as in claim 1, wherein the support device further comprises second guide members, and
the sliding and guide elements of the housing slider are engageable with the second guide members of the support device so that the housing slider is slidable with respect to the support device.

4. The apparatus as in claim 1, wherein the first guide members define two transit channels for sliding of the sliding and guide elements.

5. The apparatus as in claim 3, wherein the second guide members comprise a first groove and a second groove, the first groove being disposed between a selected wall of the walls of the chamber and the second groove, the second groove being disposed further away from the selected wall of the walls of the chamber than the first groove.

6. The apparatus as in claim 3, wherein the first guide members and the second guide members are disposed so that at least one of the first guide members and the second guide members remain engaged with the sliding and guide elements during an extraction, sliding of the housing slider outwards from the inside of transport container.

7. The apparatus as in claim 1, comprising a mobile base on an internal surface of the chamber; wherein the automatic operator device is connected to the mobile base that is configured to be moved on the internal surface of the chamber, the mobile base being movable to move the automatic operator device inside the chamber toward and away from the support device, wherein the mobile base comprises:
horizontal movement means for movement and translation of the automatic operator device on a horizontal plane, and
vertical movement means for movement along a vertical plane.

8. The apparatus as in claim 1, further comprising at least one operating station disposed inside the chamber, the at least one operating station comprising a marking device configured to apply or impress a mark on the at least one of the bacterial load detector devices.

9. The apparatus as in claim 8, wherein the mark comprises one or more:
production batch number,
time and/or day on which the at least one of the bacterial load detector devices was positioned and/or closed, and
operating zone of the chamber where the at least one of the bacterial load detector devices was positioned.

10. A method for automated management of bacterial load detector devices inside a chamber, the chamber comprising walls, at least one of the walls comprising an access aperture and a primary closing unit positioned and configured to selectively close the access aperture,
the method comprising:
engaging a transport container outside the chamber with the access aperture, the transport container being engageable with the access aperture and having a secondary closing unit sealingly connected to the primary closing unit so that the primary closing unit and the secondary closing unit open together and thereby through the access aperture fluidically connects an inside of the transport container to an inside of the chamber, with the inside of the transport container and the inside of the chamber being separate from an environment that is external of the chamber and the transport container;
preparing a housing slider sized to house at least of one or more bacterial load detector devices by placing at least one of the one or more bacterial load detector devices in the housing slider, the housing slider being disposed in the transport container;
engaging the primary closing unit and the secondary closing unit to open the access aperture and fluidically connect the inside of the transport container to the inside of the chamber;
extracting the housing slider from the transport container and disposing the housing slider inside the chamber;
positioning at least one of the one or more bacterial load detector devices on a support device disposed inside the chamber, the support device being configured to support at least one of the one or more bacterial load detector devices inside the chamber;
removing the at least one of the one or more bacterial load detector devices from the housing slider by means of an automatic operator device positioned in the chamber, the automatic operator device comprising gripping means for gripping and moving at least one of the bacterial load detector devices to alternatively remove the at least one of the at least one of the one or more bacterial load detector devices from, or deposit the at least one of the at least one of the one or more bacterial load detector devices in, the housing slider;
wherein the transport container comprises first guide members disposed in the transport container, and
wherein the housing slider comprises sliding and guide elements engaged with the first guide members of the transport container so that the housing slider is slidable within the transport container and to protrude into inside of the chamber.

11. The method as in claim 10, further comprising moving the automatic operator device within the chamber to pick up the at least one of the one or more of the bacterial load detector devices from the housing slider and put the picked up at least one of the one or more of the bacterial load detector devices in an operating zone inside of the chamber.

12. The method as in claim 10, wherein the extracting and the positioning comprise a movement of the housing slider along a trajectory formed by a translation in a rectilinear direction and a rotation.

13. The method as in claim 12, wherein the rotation a rotation of 90.

14. The method as in claim 11, wherein the picked up at least one of the one or more of the bacterial load detector devices in an operating zone includes a sedimentation plate comprising a receptacle having a lid, wherein respectively before and after moving the picked up at least one of the one or more of the bacterial load detector devices in the operating zone, the method includes removing or closing the lid of the receptacle.

15. The method as in claim 14, wherein removing or closing the lid is performed by means of a device to remove and/or close lids disposed in the chamber, and the device to remove and/or close lids is connected to the automatic operator device.

16. The apparatus as in claim 3, wherein the first guide members and the second guide members are configured and spatially disposed so that the housing slider is movable to perform a translation in a rectilinear longitudinal direction and a subsequent rotation.

17. The method as in claim 11, wherein the automatic operator device is moveable within the chamber by a mobile base that is capable of moving on an internal surface of the chamber.

\* \* \* \* \*